D. C. TELLER.
Wheel Cultivator.
No. 52,770. Patented Feb. 20, 1866.
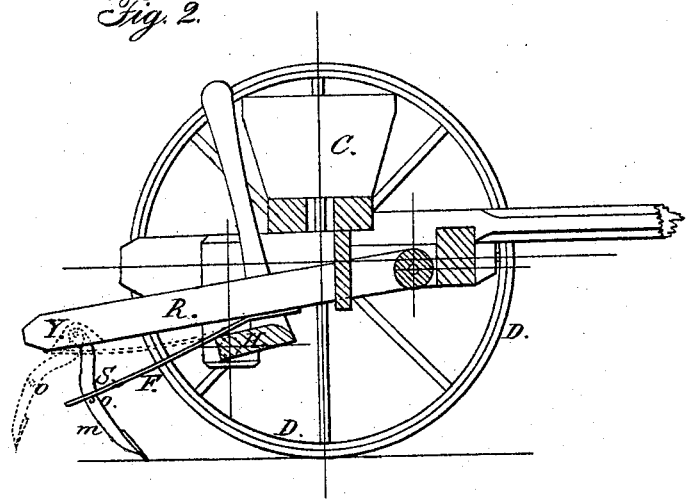
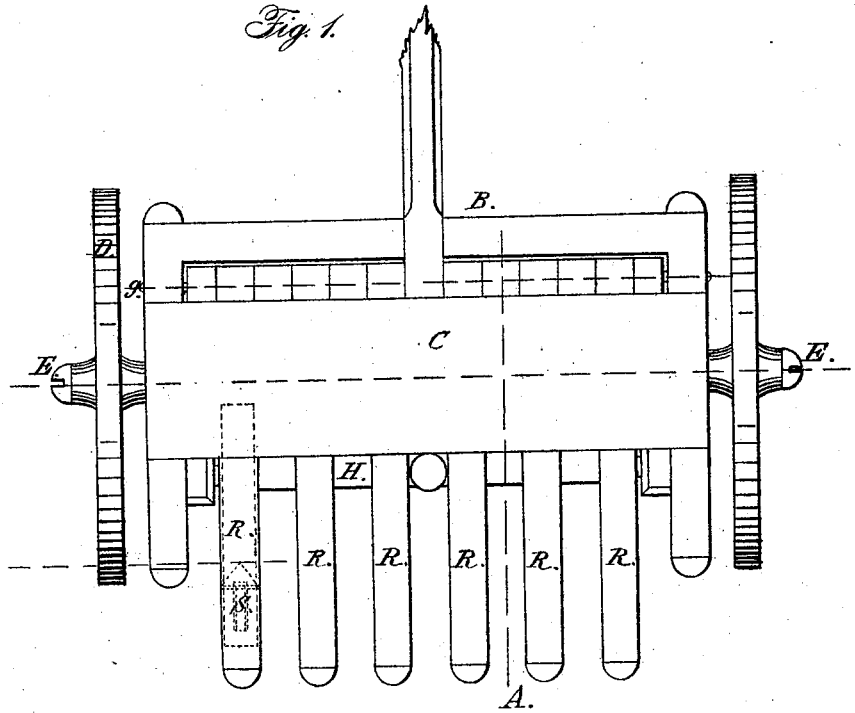
Witnesses:
J. A. King
A. C. Camb
Inventor:
D. C. Teller

UNITED STATES PATENT OFFICE.

D. C. TELLER, OF TERRE HAUTE, INDIANA.

IMPROVEMENT IN CULTIVATORS.

Specification forming part of Letters Patent No. 52,770, dated February 20, 1866.

*To all whom it may concern:*

Be it known that I, D. C. TELLER, of Terre Haute, in the county of Vigo and State of Indiana, have made new and useful Improvements in Cultivators for Pulverizing the Soil, which I call a "Self-Acting Cultivator;" and I do declare the following is a full, clear, and exact description of the same, reference being had to the annexed drawings, and letters of reference marked thereon, making a part of this specification, in which—

Figure 1 is a top view looking down on the machine, and Fig. 2 is a vertical section through A B.

The nature of my invention consists in constructing the shares or teeth of cultivators so that when being used and brought in contact with obstructions too permanent to be removed by such light implements they will yield back and bound over without breaking or being otherwise injured.

To enable others skilled in the art to make and use my invention, I will proceed to describe its operation and construction.

First, a suitable-sized frame mounted on two ordinary wheels, D, by axles E, and provided with a driver's seat or hopper, C, which, with other suitable fixtures, may be combined with this cultivator and used for sowing grain.

Suspended by a rod, I, passing through the forward part of the frame, are a series of vibrating beams, R. On the under side of these beams and near the center is permanently attached a springing draw-bar, F, bent near its fastening to a suitable distance, and through the other end is made an oblong hole, S.

M are the shares or teeth, of any desirable shape, and permanently attached to the lower end of the crooked arms $o\ m$, the upper ends of the arms passed up through the oblong hole S in the draw-bar, and into a mortise on the under sides of the beams and there fastened by a bolt or pin passed through a round hole in the beam and arm.

The mortise Y, Fig. 2, is made long, so as to allow the arms with the shares to swing back. The arms are also provided with a stop or pin, O, for the lower end of the draw-bar to rest on when the shares are in working position, and when the machine is moved forward and the shares or teeth come in contact with a stone or other obstruction too permanent for it to move, the increased force applied against the share will cause the spring draw-bar to slip upon the curved part of the arm, and the share will swing back till it comes to such an angle that it is disengaged or unhitched from the obstruction, when it will bound upward, and at the same time the downward force of the spring to the stop or pin O will bring the share or tooth back to the working position.

In place of the pin O may be used a movable stop, and fastened higher up or lower down on the arm, so that it will require more or less power to cause the teeth to yield.

When the machine is being moved from one field to another, by turning down the handle-lever attached to the lifting-beam H it will raise the shares from the ground.

Having thus fully described my invention, what I claim as new, and desire to secure by Letters Patent, is—

The arrangement of the vibrating beams R, in combination with the spring-sliding draw-bars F, and crooked arms $m$, with the stop O, substantially as specified, for the purpose set forth.

D. C. TELLER.

Witnesses:
 J. A. KING,
 A. C. CAMBY.